Patented Nov. 21, 1944

2,363,116

UNITED STATES PATENT OFFICE 2,363,116

ALKYLATION OF HYDROCARBONS

Frank H. Bruner, Beacon, N. Y., assignor to The Texas Company, New York, N. Y., a corporation of Delaware No Drawing. Original application May 4, 1939, Serial No. 271,746. Divided and this application February 4, 1943, Serial No. 474,720

6 Claims. (Cl. 260—683.4)

This invention has to do with the alkylation of hydrocarbons by the union of paraffin and olefin hydrocarbons.

This is a division of co-pending application, Serial No. 271,746, filed May 4, 1939, Patent No. 2,345,095, March 28, 1944.

In particular, the invention is concerned with the production of motor fuel hydrocarbons of improved anti-knock value from hydrocarbons, including those having from two to four carbon atoms, by reacting isoparaffins with olefins in the presence of a catalyst.

The invention broadly contemplates reacting olefin and isoparaffin hydrocarbons in the presence of a liquid catalyst comprising a boron trifluoride-water complex which can be expressed by the formula $BF_3.nH_2O$.

More specifically, the invention comprises reacting olefin hydrocarbons with isoparaffin hydrocarbons in the presence of a liquid comprising essentially $BF_3.nH_2O$, where n preferably has the value of 1 to 1.5.

It has been known to use boron trifluoride as a catalyst in the polymerization of olefin hydrocarbons. It has also been proposed to use this compound in the presence of a metallic substance, such as nickel.

It has also been proposed to use boron trifluoride and nickel in conjunction with hydrogen fluoride or water or with both for the alkylation of normally gaseous paraffin hydrocarbons with normally gaseous olefins. This operation, however, has involved using the boron trifluoride and the hydrogen fluoride in the gaseous phase wherein these gases, along with the hydrocarbon gas, have been passed over the metal catalyst.

The present invention, in contradistinction, involves the employment of a boron trifluoride and water complex in the form of a liquid and which does not require the presence of metallic substances, such as nickel, to effect the alkylation reaction.

Early workers and text-books have referred to the solution obtained by passing $BF_3$ into water as hydrofluoboric acid. Boris acid, $H_3BO_3$ was considered a by-product of the preparation. However, it has been found recently that boric acid, itself, reacts with $BF_3$ to form a hydroxy-fluoboric acid which would indicate that a solution of $BF_3$ in water is a much more complex solution than formerly believed. Commercial hydrofluoboric acid is available as an aqueous solution, having a specific gravity of approximately 1.2 and containing only 40% of $HBF_4$, the remainder being water.

The preferred liquid of the present invention is prepared by passing $BF_3$ into water until a saturated solution is obtained which has a gravity of about 1.77. This liquid is further distinguished from commercial hydrofluoboric acid and dilute solutions of $BF_3$ in water in that it is a very effective catalyst for alkylation of isoparaffins with olefins, even to the extent of alkylating isobutane with ethylene.

In the preparation of the catalyst, boron trifluoride is passed into water, maintained at around room temperature, until no more of the compound is absorbed. Boron trifluoride reacts almost instantaneously with water with the initial production of a flocculent precipitate of boric acid and the probable formation of hydrofluoboric acid according to the following equation:

$$4BF_3 + 3H_2O \rightarrow 3HBF_4 + H_3BO_3$$

Upon passing additional $BF_3$ into the solution the precipitate gradually disappears with the production of a solution, which finally becomes saturated with boron trifluoride. The resulting solution is a slightly cloudy liquid and apparently substantially anhydrous. This saturated solution of $BF_3$ and $H_2O$ has an approximate composition of 21% $H_2O$ and 79% $BF_3$ by weight corresponding to an equimolecular mixture of $BF_3$ and $H_2O$. The exact reaction products are not known but by using equimolecular quantities of $BF_3$ and $H_2O$ the following equations containing possible products may be written:

$$2BF_3 + 2H_2O \rightarrow HBF_4 + HBF_2(OH)_2$$
<center>Hydro-      Dihydroxyfluoboric<br>fluoboric          acid<br>acid</center>

$$BF_3 + H_2O \rightarrow HBF_3(OH)$$
<center>Monohydroxyfluoboric<br>acid</center>

These equations are not to limit the scope of the reaction of $BF_3$ and $H_2O$ but are to illustrate possible active ingredients. It is possible that any of the hydrofluoboric or hydroxyfluoboric acids formed in the reaction might dissociate to form HF and/or $BF_3$ molecules dissolved in the other constituents.

This saturated solution of $BF_3$ in $H_2O$ upon dilution with more than 10% $H_2O$ becomes substantially ineffective in its ability to catalyze alkylation. This ratio of $BF_3$ in $H_2O$ corresponds to a composition of $BF_3.1\frac{1}{2}H_2O$, so that the critical composition range is $BF_3.1H_2O$ to $BF_3.1\frac{1}{2}H_2O$, or a complex containing from 21% to 29% $H_2O$ by weight, some of which above 21% may be water of dilution.

The catalyst preparation is not limited to forming the complex of BF₃ in H₂O, but solutions, such as commercial hydrofluoboric acid, commercial hydrofluoric acid, etc., and pure compounds, such as boric acids, hydroxyfluoboric acids, etc., may be used as absorbents for BF₃ to form hydro- and/or hydroxy-compounds of boron and fluorine in essentially an anhydrous state, or containing only a small proportion of water within the critical concentration set forth above. These liquid acid catalysts of this invention are hereinafter referred to in the description and claims as a "boron trifluoride-water complex" or "BF₃.nH₂O," where n has a value ranging from about 1 to 1.5.

Like concentrated sulphuric acid, it functions as a catalyst in the liquid phase, giving substantially similar results to those obtained with sulphuric acid in the alkylation of $C_3$ and $C_4$ olefins. It is superior to sulphuric acid as an alkylation catalyst at higher temperatures of the order of 100 to 150° F., because at these temperatures it does not act as an oxidizing agent. This non-oxidizing character is of substantial advantage as regards obtaining complete recovery of the catalyst from the reaction products.

The invention will be understood further from the following examples descriptive of batch type liquid phase operations, using as the catalyst the anhydrous liquid BF₃.H₂O as prepared above:

Example 1

Into an agitated mixture containing 190 grams of the catalyst and 301 grams of isobutane, 99 grams of isobutylene were charged in 30 minutes, the reaction mixture being stirred during an additional 30 minutes. The reaction temperature was held at about 120° F. The reaction mixture thereafter was removed and the reacted hydrocarbons separated from the catalyst and stabilized to separate $C_4$ and lighter hydrocarbons, giving a yield of total liquid products of 192.8% by weight on the basis of the olefin charged. The total liquid products were fractionated to produce a fraction having an end point of 311° F. The fraction so obtained amounted to 164.0% by weight based on the olefin charged. An identical experiment was made, except for employing a reaction temperature of 75° F. In this case the yield of total liquid products amounted to 187.0% based on the olefin, and the yield of 311° F. end point fraction amounted to 147.8% based on the olefin charged.

Example 2

A quantity of $C_4$ cut from a plant gas containing 104 grams of $C_4$ olefins and 113 grams of isobutane was charged in 60 minutes time to an agitated mixture of 181 grams of catalyst and 201 grams of isobutane. Stirring was continued for an additional 60 minutes. The reaction temperature was maintained at 60° F. The yield of total liquid product was 159.4% based on the olefin; and the yield of the 311° F. end point fraction was 116.3% based on the olefin charged. The reduced yields in this example are attributed in part to less efficient agitation.

Example 3

A mixture of 335 grams of isobutane and 220 grams of catalyst was heated to 112–115° F. and agitated while 68 grams of propylene were added over a period of one hour. Stirring and heating were continued for an additional hour. The stabilized liquid product obtained amounted to 135 grams or 198% of the olefin charged. Ninety-three volume per cent of this liquid product distilled below 311° F. and had a bromine number of 1.0.

Example 4

195 grams of the catalyst and 335 grams of isobutane were charged to the reaction vessel and the temperature maintained at 140° F. During agitation 50 grams of ethylene were added at such a rate that the pressure was maintained at approximately 200 pounds per square inch. Stirring and heating were continued for an additional 5⅓ hours. The stabilized liquid product weighed 73 grams and constituted 146% of the ethylene charged. Eighty-six volume per cent of this product boiled below 234° F.

Example 5

A hydrocarbon mixture was formed consisting of about 7.5% ethylene, 13.3% propylene, 14.2% $C_4$ olefins, 17% isobutane, 42.4% propane, 1.5% ethane, 3% normal butane, and 1% pentane. 173 grams of this mixture were added to an agitated mixture of 335 grams of isobutane and 180 grams of catalyst maintained at a temperature of around 69 to 75° F. Stirring was continued for an additional hour. The stabilized liquid product obtained amounted to 115 grams or 190% by weight of the olefins charged. The gas discharged from the reaction vessel was essentially saturated. 74% of the liquid product distilled below 311° F.

While batch type experiments have been described above, it is contemplated that continuous operations involving concurrent, countercurrent, or a combination of concurrent and countercurrent flow may be employed, the reaction being carried out in either a single or a plurality of stages, as may be desired.

It is advantageous to operate in a manner so as to maintain a substantial excess of isoparaffin within the reaction zone. For example, the ratio of isoparaffin to olefin may be from one to six or more parts by weight of isoparaffin to one part by weight of olefin.

The unreacted paraffin hydrocarbons can be separated from the reaction products and recycled through the reaction zone. The hydrocarbon feed may comprise normally liquid saturated and unsaturated hydrocarbons, or a mixture of normally liquid and normally gaseous hydrocarbons. The olefin feed may comprise either pure or selected fractions from cracked or polymer gasolines. Likewise, it is contemplated that the paraffin feed may comprise normal as well as isoparaffin hydrocarbons.

It is contemplated that the catalyst is effective for the alkylation with isoparaffins of alcohols, ethers and alkyl halides.

Operations may be carried out under atmospheric, sub-atmospheric or superatmospheric pressure, but, preferably, under sufficient pressure to maintain the reacting materials in the liquid phase at the temperature of reaction. The temperature of reaction may range from 60° F. or lower to 150° F., but preferably between 90° F. and 110° F.

It is also contemplated that where the reaction is carried out in a plurality of stages split feed of the olefin may be employed, charging a portion of the olefin hydrocarbons to each of a plurality of stages in the reaction system.

In the parent application Serial No. 271,746, there is claimed isoparaffin-olefin alkylation with a catalyst comprising a boron fluoride-water complex. In the present application, there is claimed isoparaffin-olefin alkylation with a catalyst composition prepared only from HF, H₂O and BF₃, such as by utilizing commercial or aqueous hydrofluoboric or hydrofluoric acid as the absorbent for BF₃ to produce the catalyst in essentially an anhydrous state, or with only a limited amount of water within the effective alkylation range.

Obviously many modifications and variations of the invention, as hereinbefore set forth, may be made without departing from the spirit and scope thereof and therefore only such limitations should be imposed as are indicated in the appended claims.

I claim:

1. A process for the production of normally liquid saturated hydrocarbons which comprises reacting at least one paraffinic hydrocarbon containing at least one tertiary carbon atom per molecule with at least one olefinic hydrocarbon under alkylation conditions in the presence of a catalyst composition prepared only from HF, H₂O, and BF₃.

2. A process for the production of normally liquid saturated hydrocarbons which comprises reacting at least one paraffinic hydrocarbon containing at least one tertiary carbon atom per molecule with at least one monoolefinic hydrocarbon under alkylation conditions in the presence of a catalyst composition prepared by saturating an aqueous hydrogen fluoride solution with boron fluoride at about room temperature.

3. A process as in claim 2 wherein the paraffinic component contains isobutane.

4. A process as in claim 2 wherein the reaction is carried out continuously with vigorous agitation and under sufficient superatmospheric pressure to maintain the reaction mixture in the liquid phase.

5. The method of producing high anti-knock hydrocarbons which comprises alkylating an isoparaffin with an olefin under alkylation conditions in the presence of a catalyst composition prepared by absorbing BF₃ in aqueous HF to convert the same to essentially an anhydrous state.

6. The method of producing high anti-knock hydrocarbons which comprises alkylating an isoparaffin with an olefin under alkylation conditions in the presence of a catalyst composition prepared by absorbing BF₃ in aqueous hydrofluoboric acid to convert the same to essentially an anhydrous state.

FRANK H. BRUNER.